April 25, 1939. O. E. TRAUTMANN 2,155,570
FOCUSING MECHANISM
Filed Oct. 27, 1937
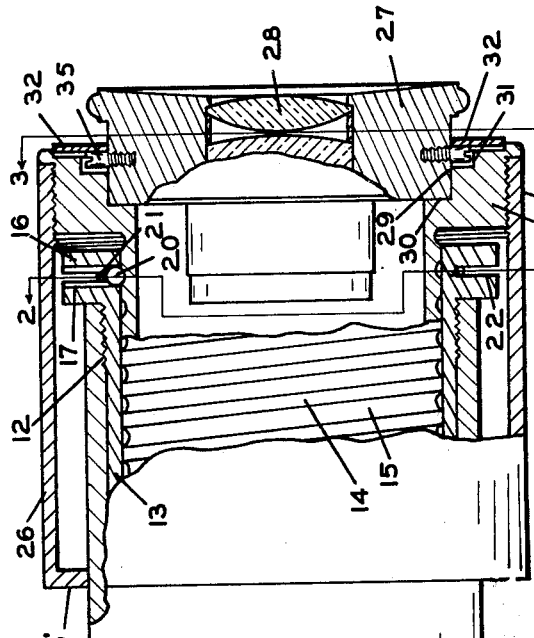
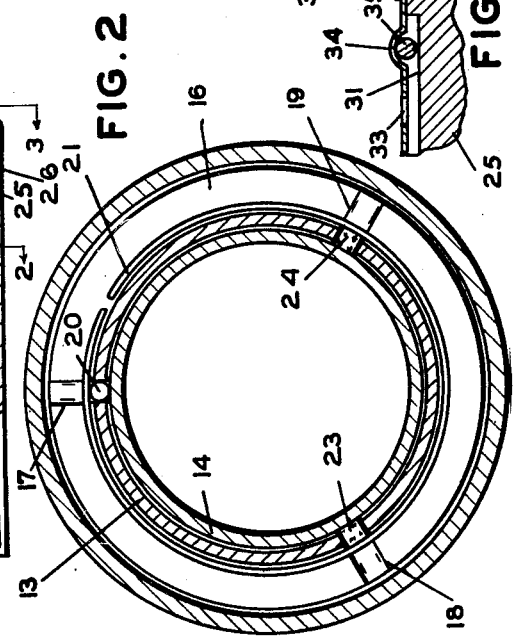
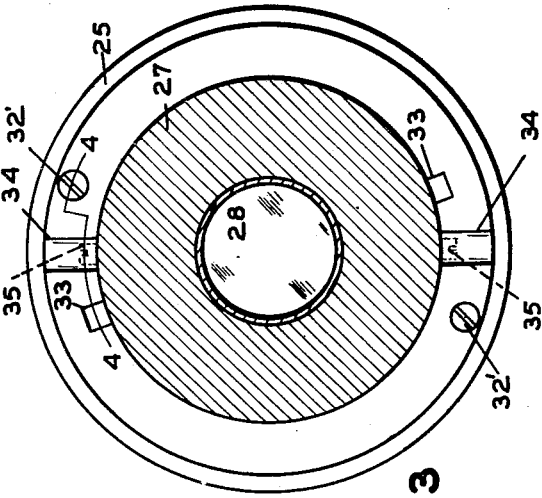
OTTO E. TRAUTMANN
INVENTOR.
BY
ATTORNEYS Patented Apr. 25, 1939

2,155,570

UNITED STATES PATENT OFFICE 2,155,570

FOCUSING MECHANISM

Otto E. Trautmann, Irondequoit, N. Y., assignor to Bausch & Lomb Optical Company, Rochester, N. Y., a corporation of New York Application October 27, 1937, Serial No. 171,245

6 Claims. (Cl. 88—32)

The present invention relates to optical instruments and more particularly to telescopes and focusing means therefor.

One of the objects is to provide a telescope having a focusing mechanism which is simple in construction and smooth and rugged in operation. Another object is to provide a focusing mechanism which has a smooth and uniform friction under all conditions. A further object is to provide a focusing mechanism having both coarse and fine adjustments and means for regulating the friction during movement. These and other objects and advantages reside in certain novel features of construction, arrangement and combination of parts as will hereinafter be more fully set forth and pointed out in the appended claims.

Referring to the drawing:

Fig. 1 is a side elevation with parts in section, of a telescope embodying the present invention.

Fig. 2 is a cross section thereof taken on line 2—2 of Fig. 1.

Fig. 3 is a cross section thereof taken on line 3—3 of Fig. 1.

Fig. 4 is a cross section taken on line 4—4 of Fig. 3.

In the drawing, my invention is illustrated as applied to a telescope having an outer tube 10 carrying at one end the usual objective 11. The other end of the tube 10 is threaded at 12 and a bearing tube or sleeve 13 is fixedly secured thereto.

A sleeve 14 is slidably and rotatably mounted in the bearing sleeve 13 and is provided on its outer surface with a shallow cam groove 15 which may be helical or some other spiral shape. The tube or sleeve 13 has an enlarged portion 16 outside of the tube 10 and a plurality of slots 17, 18 and 19 extend radially through this enlarged portion 16. A ball 20 is movably mounted in the slot 17 and projects into the cam groove 15. A spring 21 which lies in a peripheral groove 22 in the portion 16 urges the ball 20 into resilient contact with the groove 15 so that the sleeve 14 can be moved axially by a straight pull which displaces the ball 20 from the groove 15. Rotation of the sleeve 14 also causes an axial movement due to the coaction between the cam groove 15 and the ball 20.

Two friction blocks 23 and 24 are slidably mounted in the grooves 18 and 19, respectively, and are urged toward the sleeve 14 by the spring 21. These blocks 23 and 24 are preferably made of a non-metallic substance such as fiber, etc., as pointed out in my co-pending application Serial No. 98,214 filed August 27, 1936, for a Telescope or the like. It is possible to use one or more of these blocks and they should be of a width greater than that of the groove 15. The three slots 17, 18 and 19 are preferably coplanar, that is, they lie in the same plane.

The outer end of the sleeve 14 has a flange 25 which extends outwardly beyond the portion 16. An outer sleeve 26 is threaded onto the flange 25 and terminates in an inward flange 26' which protects the focusing mechanism from dust and dirt. This outer sleeve 26 forms a conveniently accessible means for operating the focusing mechanism.

The ocular 27 having lenses 28 is carried by the sleeve 14 in such a way that it can be readily and rapidly attached or removed. The flange portion 25 of the sleeve 14 has a central recess 29 terminating at a shoulder 30 which forms a seat for the ocular 27. In order to secure the ocular in this seat, the flange 25 is provided with a second recess 31, and a flat resilient ring 32 is secured to the flange 25 by screws 32' so that it overlies the recess 31. This ring 32 has two opposite slots 33 and two opposite depressions 34. Two oppositely projecting lugs 35 are affixed to the ocular 27 in such a way that they may pass through the slots 33 and, upon turning the ocular, come to rest and be latched in position under the depressions 34 as shown in Figs. 3 and 4.

The ocular 27 may be roughly focused by merely pulling the sleeve 26 toward the right in Fig. 1, because the groove 15 is sufficiently shallow to push the ball 20 outward against spring 21. Upon reaching an approximate focus in this way, accurate focus is obtained by rotating the sleeve 26 so that the ball 20 acts as a fixed projection cooperating with the cam groove 15. During all of these movements, the blocks 23 and 24 give a uniform and smooth friction unaffected by temperature, humidity, wear or other variable conditions.

From the foregoing, it will be apparent that I am able to attain the objects of my invention and provide a smooth, efficient, rugged and durable focusing mechanism. While I have described my invention as applied to a telescope, obviously it can be as readily applied to photographic objectives, microscopes or the like. Various structural modifications can also be made without departing from the spirit of my invention or the scope of the appended claims.

I claim:

1. In an optical instrument, a focusing mechanism comprising two telescoping tubes, one of said tubes having a helical groove in the surface next to the second tube, the second tube being provided with a plurality of slots extending substantially radially therethrough, a member slidably mounted in one slot, means for urging said member into said groove, a friction element slidably mounted in each of the other slots, and means for urging each friction element into engagement with the first-named tube each friction element being wider than the groove so that said elements will not enter the groove.

2. A telescope comprising a tube, an objective carried by said tube, a sleeve slidably and rotatably mounted in one end of said tube, an ocular carried by said sleeve, said sleeve having a cam groove in its outer surface, said tube having a plurality of substantially coplanar slots extending substantially radially therethrough adjacent the end in which said sleeve is mounted, a member slidably mounted in one of said slots adapted to engage in the groove in said sleeve, means for urging said member toward said sleeve, a friction element slidably mounted in each of the other slots, and means for urging each friction element into engagement with said sleeve said elements being of such size and so positioned that they engage the outer surface of the sleeve without extending into the cam groove.

3. In a telescope or the like, a tube, an optical element mounted within said tube, a sleeve rotatably and axially slidably mounted in one end of said tube, an optical element mounted within said sleeve, said sleeve having a substantially helical groove in its outer surface, a plurality of coplanar slots through said tube adjacent said sleeve, a member in one of said slots for engaging in the groove in said sleeve, a friction element slidably mounted in each of the other slots for engaging said sleeve and means for urging said member and each friction element into contact with said sleeve.

4. A focusing mechanism for a telescope or the like comprising a tube member carrying a lens, said tube having one or more coplanar slots extending substantially radially therethrough adjacent one end thereof, a sleeve member rotatably and slidably mounted in the slotted end of said tube, a lens carried by said sleeve member, one of said members having a cam groove, a projection on the other member engaging in said groove, a friction block in each slot, and means for urging each friction block into engagement with said sleeve member.

5. A focusing mechanism for a telescope or the like comprising a tube member carrying a lens, said tube having one or more coplanar slots extending therethrough adjacent one end thereof, a sleeve member rotatably and slidably mounted in the slotted end of said tube, a lens carried by said sleeve member, one of said members having a cam groove, a projection on the other member engaging in said groove, a friction block in each slot, means for urging each friction block into engagement with said sleeve member, and an ocular removably mounted in said sleeve member.

6. A focusing mechanism for an optical instrument comprising a tube member carrying a lens, said tube member having one or more coplanar slots extending substantially radially therethrough adjacent one end thereof, a sleeve member rotatably and slidably mounted in the slotted end of said tube, a lens carried by said sleeve, a non-metallic friction block slidably mounted in each slot, spring means carried by said tube and engaging said friction blocks to press them into frictional engagement with said sleeve, and cooperating projection and cam groove means on said members whereby rotation of said sleeve causes longitudinal movement thereof.

OTTO E. TRAUTMANN.